Figure 1:
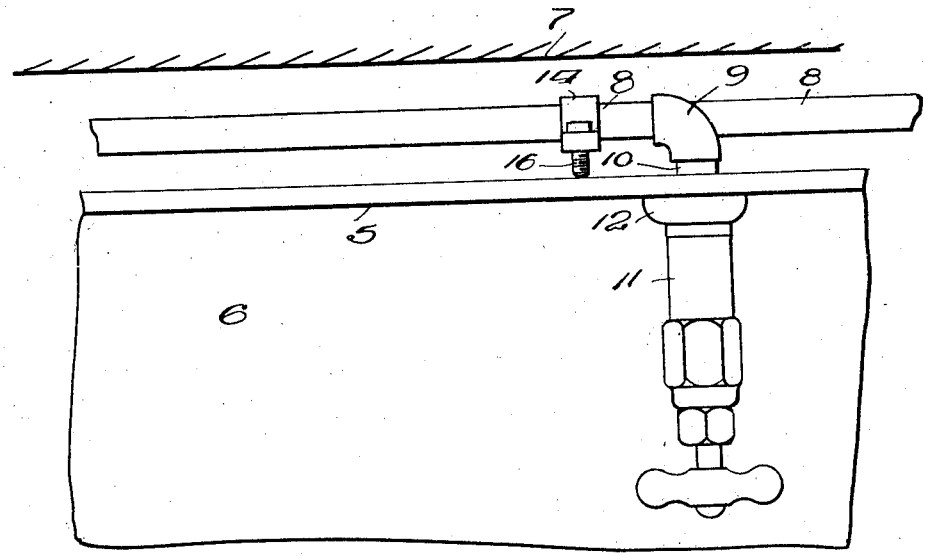

T. F. SPELLMAN.
PIPE ATTACHMENT.
APPLICATION FILED APR. 4, 1919.

1,355,862.

Patented Oct. 19, 1920.

Thomas F. Spellman
Inventor

By Geo. F. Kimmel
Attorney

UNITED STATES PATENT OFFICE.

THOMAS F. SPELLMAN, OF WAUKEGAN, ILLINOIS.

PIPE ATTACHMENT.

1,355,862.   Specification of Letters Patent.   Patented Oct. 19, 1920.

Application filed April 4, 1919. Serial No. 287,654.

*To all whom it may concern:*

Be it known that I, THOMAS F. SPELLMAN, a citizen of the United States, residing at Waukegan, in the county of Lake and State of Illinois, have invented certain new and useful Improvements in Pipe Attachments, of which the following is a specification.

This invention has for its object to provide an attachment for pipes designed for application to pipes in buildings which will effectively maintain the ornamental flanges of exposed fittings such as faucets in firm engagement with tubs, lavatories, basins and similar fittings so as to provide a tight and present a neat appearing faucet.

Another object is the provision of a pipe attachment of this character which is concealed behind the basin or other object and consequently may be cheaply cast from an inferior grade of metal.

With the above and other objects in view as will appear as the description proceeds, the invention comprises the novel features of construction, combination and arrangement of parts which will be more fully described in the following specification and then finally embodied in the claim appended hereto.

Figure 2:
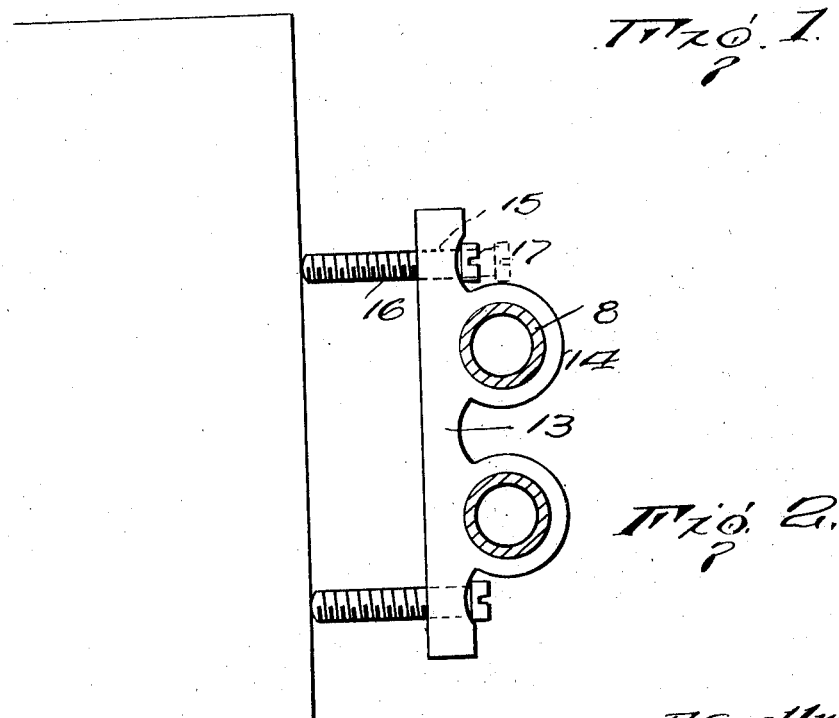

In the drawings:

Figure 1 represents a fragmentary plan view of a basin or tub and the hot and cold water pipes associated therewith illustrating the invention applied to use, and Fig. 2 represents a transverse sectional view through the pipes illustrating the invention applied to use.

Referring to the drawings in detail, wherein similar reference numerals designate corresponding parts the numeral 5 indicates a fragment of the vertically disposed rear wall of a basin 6 adequately supported upon the wall 7 of a building in such relation thereto as to afford the necessary base for hot and cold water pipes 8 provided with elbows 9 connected with the forwardly extending pipe sections 10 which are received in openings provided in the rear wall of the basin 6. The usual faucet or other fitting 11 is applied to the front end of the pipe sections 10 and is provided with the usual ornamental and clamping flange 12 which is intended to firmly seat against the front surface of the rear wall 5 of the basin but which, very frequently, is improperly held in position and is only loosely associated with the basin and presents an unsightly appearance.

The improved attachment consists of a body plate 13 provided with spaced laterally projecting rings or loops 14 preferably formed integral with the body 13 and having an internal diameter approximately corresponding to the internal diameter of the pipes 8 and adapted to receive and support the latter in properly vertically disposed spaced relation.

The terminals of the body 13 exteriorly of the loops 14 are provided with internally threaded apertures 15 extending at right angles to the bores of the rings 14 and receiving the adjusting screws 16 which, for convenience of adjustment, are provided with slotted headed terminals 17. By disposing the screws 16 in the manner shown and described adjustment of the plate 13 may be effected, also, at any desired angle to accommodate for instance two different types of pipes; it being necessary to merely adjust each screw 16 independently of the other.

In applying the invention to use, the pipes 8 are slipped through the rings 14 preliminary to the application of the elbows 9 and the screws 16 are adjusted so as to engage the rear surface of the rear wall 5 of the basin and move the pipes 8 rearwardly, thus firmly drawing the flange 12 against the back of the basin and exerting a tight joint and an attractive appearance.

What I claim is:

A support for pipes comprising an elongated substantially rectangular body provided with a screw threaded opening adjacent each of its ends, laterally projecting rings formed integrally with the body and each disposed between the center portion of the body and a screw threaded opening and adapted to receive pipes therethrough, and set screws receivable in the screw threaded openings for adjusting the distance and relative position of the body to a base.

In testimony whereof, I affix my signature hereto.

THOMAS F. SPELLMAN.